United States Patent
Wang et al.

(10) Patent No.: US 8,270,082 B2
(45) Date of Patent: Sep. 18, 2012

(54) MICROSTRUCTURE DIFFUSER

(75) Inventors: Chun-Wei Wang, Sanxia Town (TW);
Wen-Feng Cheng, Hubei Village (TW);
Chih-Wei Huang, Taipei (TW);
Yan-Zuo Chen, Taoyuan (TW)

(73) Assignee: Entire Technology Co., Ltd., Taoyuan County (TW)

( * ) Notice: Subject to any disclaimer, the term of this patent is extended or adjusted under 35 U.S.C. 154(b) by 453 days.

(21) Appl. No.: 12/457,564

(22) Filed: Jun. 16, 2009

(65) Prior Publication Data

US 2010/0315716 A1    Dec. 16, 2010

(51) Int. Cl.
*G02B 5/02*    (2006.01)
(52) U.S. Cl. ......................................................... 359/599
(58) Field of Classification Search .................. None
See application file for complete search history.

(56) References Cited

U.S. PATENT DOCUMENTS

| 6,456,436 | B2 * | 9/2002 | Miura et al. .................. 359/619 |
| 6,606,133 | B1 | 8/2003 | Okabe |
| 7,255,456 | B2 | 8/2007 | Yao et al. |

* cited by examiner

*Primary Examiner* — Derek S Chapel
(74) *Attorney, Agent, or Firm* — Rosenberg, Klein & Lee

(57) ABSTRACT

A microstructure diffuser includes a light-entering surface, a light-emitting surface, and a plurality of microstructure portions having a first microstructure unit and a second microstructure unit. The first microstructure unit includes a first side surface, a second side surface, a top surface, a first pitch (P1), a second pitch (P2), and a height (H). The second microstructure unit has a curve function shape and is located at the light-emitting surface. The first side surface and the second side surface of the first microstructure unit receive the light beam of the light source to form a first optical path. The top surface of the first microstructure unit receives the light beam of the light source to form a second optical path. The second microstructure unit receives the light beam of the light source to form a third optical path.

2 Claims, 9 Drawing Sheets

MICROSTRUCTURE DIFFUSER

BACKGROUND OF THE INVENTION

1. Field of the Invention

The present invention relates to a microstructure diffuser. In particular, the present invention relates to a microstructure diffuser that has a variety of optical structure bodies.

2. Description of Related Art

The technology of diffusers is continuously improved so as to make light beams more uniform. Firstly, a single prism is developed. For example, U.S. Pat. No. 6,606,133 discloses a diffuser that has optical structure on both its light-emitting surface and its light-entering (as shown in FIG. 1). The diffuser 1A has a main body portion 2A. One side surface of the main body portion 2A is the light-entering surface, and another side surface is the light-emitting surface. The light-emitting surface has a prism structure 3A. The light-entering surface has a plurality of convex body structures 4A. However, in a general manufacturing process, the manufacturing process for double-surfaces is difficult, the yield rate is low, and additional problems may occur when the optical film is assembled. U.S. Pat. No. 7,255,456 discloses a diffuser that has two kinds of optical structures respectively on its light-emitting surface and its light-entering surface. These two kinds of optical structures are a prism and a lenticular. This diffuser has the following drawbacks. 1. These two kinds of optical structures merely have a single optical effect. The prism merely has the beam-splitting effect. The lenticular merely has the beam-diffusing effect. Therefore, the uniformity of light beam is not good. 2. The prism has a pointed tip. When the prism is installed with other optical lens, the optical film may be scratched so that the reliability is reduced. 3. When the diffuser is produced, the pointed tip causes the yield rate of the diffuser to reduce, and furthermore it is more difficult to form the diffuser.

In other words, the diffuser of the prior art has problems, such as the uniformity of light beam cannot be enhanced, and the yield rate is low, etc. Thereby, the backlight module may be improved.

SUMMARY OF THE INVENTION

One particular aspect of the present invention is to provide a microstructure diffuser. The microstructure diffuser has an optical structure that has over two kinds of structures. A single optical structure has two kinds of optical effects, including light splitting and light diffusion, to provide a uniform light beam.

The microstructure diffuser includes a light-entering portion and a light-emitting portion. The light-entering portion is for receiving a light beam of a light source. The microstructure diffuser includes a plurality of microstructure portions covered on the light-emitting portion. The plurality of microstructure portions includes a first microstructure unit and a second microstructure unit. The first microstructure unit includes a first side surface, a second side surface, a top surface, a first pitch (P1), a second pitch (P2), and a height (H). The first side surface and the second side surface respectively have a first slope and a second slope. The first side surface and the second side surface are respectively located at two sides of the top surface, and have a distance of the second pitch between the first side surface and the second side surface. The first side surface and the second side surface are respectively located at two sides of the light-emitting portion, and another distance of the first pitch between the first side surface and the second side surface. The distance between the top surface and the light-emitting portion is the height.

The first slope and the second slope meet the follow formula.

$$1/2 \leq 2H/|(P1-P2)/2| \leq 9/5.$$

The second microstructure unit has a curve function shape and is located at the light-emitting portion. The second microstructure unit is adjacent to the first microstructure unit. The second side surface of the Second microstructure unit and the first microstructure unit forms a first low point. The first side surface of the second microstructure unit and another first microstructure unit forms a second low point. The first low point and the second low point are located at the light-emitting portion.

When the plurality of microstructure portions receive the light beam of the light source, the first side surface and the second side surface of the first microstructure unit receive the light beam of the light source to form a first optical path. The top surface of the first microstructure unit receives the light beam of the light source to form a second optical path. The second microstructure unit receives the light beam of the light source to form a third optical path.

The present invention also discloses a microstructure diffuser that includes a light-entering portion and a light-emitting portion. The light-entering portion is for receiving a light beam of a light source. The microstructure diffuser includes a plurality of microstructure portions covered on the light-emitting portion. The plurality of microstructure portions includes a first microstructure unit and a second microstructure unit. The first microstructure unit includes a first side surface, a second side surface, a first top surface, a first pitch (P1), a second pitch (P2), and a height (H). The first side surface and the second side surface respectively have a first slope and a second slope. The first side surface and the second side surface are respectively located at two sides of the top surface, and a distance between the first side surface and the second side surface is equal to the second pitch. The first side surface and the second side surface are respectively located at two sides of the light-emitting portion, and another distance between the first side surface and the second side surface is equal to the first pitch. The distance between the top surface and the light-emitting portion is the height.

The first slope and the second slope meet the follow formula.

$$1/2 \leq 2H/|(P1-P2)/2| \leq 9/5.$$

The second microstructure unit includes a third side surface, a fourth side surface, and a second top surface. The third side surface and the fourth side surface respectively have a third slope and a fourth slope. The third side surface and the fourth side surface respectively are located at two sides of the second top surface. The second microstructure unit is adjacent to the first microstructure unit. The third side surface of the second microstructure unit and the second side surface of the first microstructure unit form a first low point. The fourth side surface of the second microstructure unit and the first side surface of another first microstructure unit form a second low point. The first low point and the second low point are located at the light-emitting portion.

When the plurality of microstructure portions receive the light beam of the light source, the first side surface and the second side surface of the first microstructure unit receive the light beam of the light source to form a first optical path. The third side surface and the fourth side surface of the second microstructure unit receive the light beam of the light source to form a second optical path. The first top surface of the first microstructure unit receives the light beam of the light source to form a third optical path. The second top surface of the second microstructure unit receives the light beam of the light source to form a fourth optical path.

The present invention also discloses a backlight module with the microstructure diffuser.

The present invention has the following characteristics. The optical structure body of the present invention has both the light splitting effect and the light diffusion effect. For example, the linear side surface of the substantially trapezoid shaped optical structure body can split light beam, while the slightly curved top surface can diffuse light beam. The optical structure body with two kinds of structures can perfectly result in uniform light beam.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
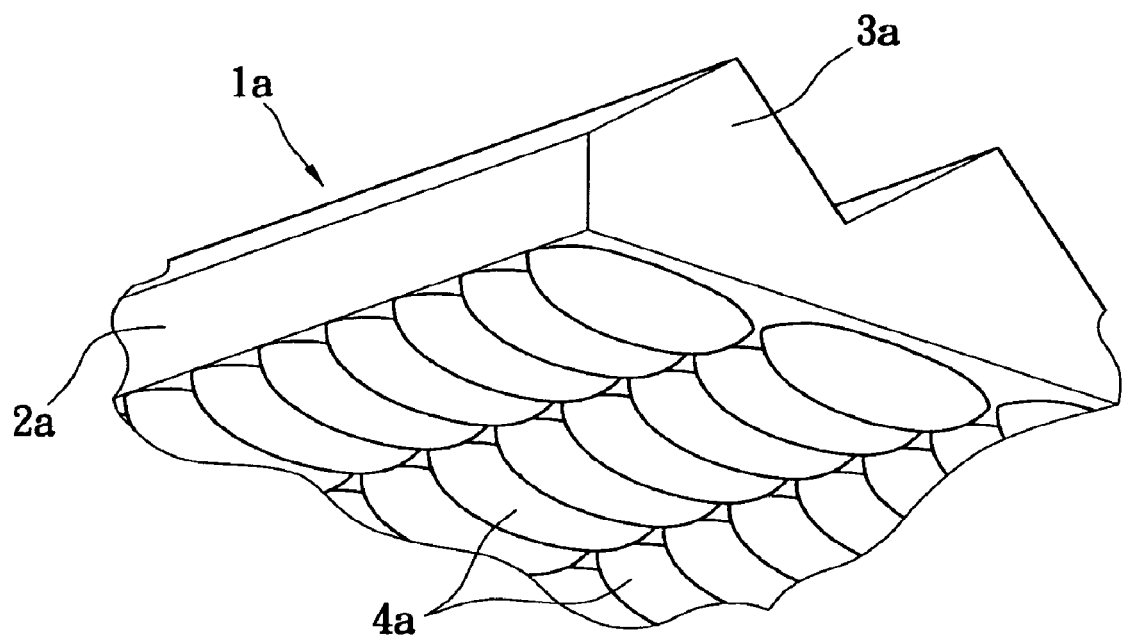
FIG. 1 is a schematic diagram of a diffuser of the prior art.

The present invention provides a microstructure diffuser 1. The microstructure diffuser 1 has an optical structure body that has over two kinds of structures to achieve the diffusion effect so as to result in uniform light beam. Reference is made to FIGS. 2, 2A, 2B, and 2C, which are the first embodiment of the present invention. The microstructure diffuser 1 includes a light-entering portion 100 and a light-emitting portion 101. The light-entering portion 100 receives a light beam of a light source (the arrow in FIG. 2). The light-emitting portion 101 has a plurality of microstructure portions 120 that includes a plurality of first microstructure units 121 and a plurality of second microstructure units 122 that are crossly disposed. The two optical structure bodies are different. The two optical structure bodies can generate different optical effects to the emitted lighted beam. The light-entering portion 100 is a simple plate to improve the yield rate. The first microstructure unit 121 has a substantially trapezoid shaped lateral cross section, which includes a substantially linear first side surface 1211A, a substantially linear second side surface 1211B, and a top surface 1212A substantially parallel to the light-entering portion 100 that can be slightly curved. The above structure defines a first pitch P1, a second pitch P2, and a height H. The first side surface 1211A and the second side surface 1211B respectively are located at two sides of the top surface 1212A. The first side surface 1211A and the second side surface 1211B respectively have a first slope and a second slope. The second pitch P2 is the distance between the first side surface 1211A and the second side surface 1211B. The first pitch P1 is another distance between the first side surface 1211A and the second side surface 1211B. The first pitch P1 is the maximum distance between the first side surface 1211A and the second side surface 1211B. The second pitch P2 is the minimum distance between the first side surface 1211A and the second side surface 1211B. The height H is the distance between the top surface 1212A and the light-emitting portion 101. The first slope and the second slope meet the following formula, $1/2 \leqq 2H(/(P1-P2)/2 \leqq 9/5$, so as to achieve the optimum lighting status.

The second microstructure unit 122 has a curve function shape and is located on the light-emitting portion 101. The second microstructure unit 122 is adjacent to the first microstructure unit 121, and both are crossly disposed. The second side surface 1211B of the second microstructure unit 122 and the first microstructure unit 121 forms a first low point 131. The first side surface 1211A of the second microstructure unit 122 and the first microstructure unit 121 forms a second low point 132. The first low point 131 and the second low point 132 are located at the light-emitting portion 101.

When the plurality of microstructure portions 12 receive the light beam of the light source, the first side surface 1211A and the second side surface 1211B of the first microstructure unit 121 receive the light beam 30 of the light source to form a first optical path. The top surface 1212A of the first microstructure unit 121 receives the light beam 30 of the light source to form a second optical path. The second microstructure unit 122 receives the light beam 30 of the light source to form a third optical path.

In one embodiment, the second microstructure unit 122 has a cone curve-shaped structure, such as a line that meets the equation of a circle, an ellipse, or a parabola. The cone coefficient of the cone curve is less than or equal to −1. Thereby, the structure body with the cone curve shape can provide the light diffusion effect.

Figure 2:
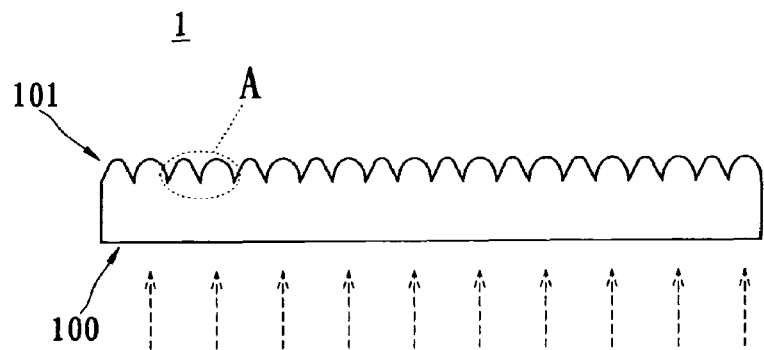
FIG. 2 is a schematic diagram of a microstructure diffuser of the first embodiment of the present invention.
Figure 2A:
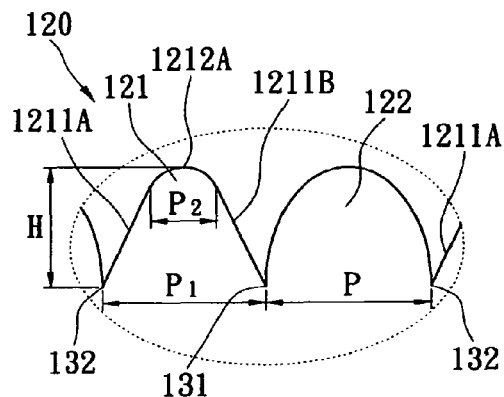
FIG. 2A is an enlarged diagram of part A in FIG. 1.
Figure 2B:
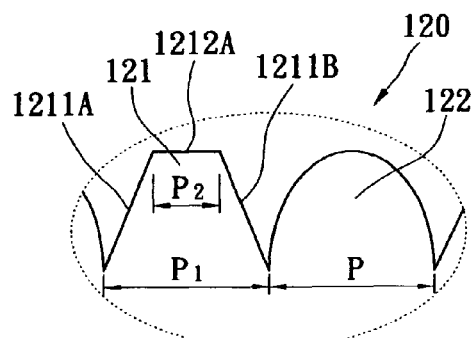
FIG. 2B is another schematic diagram of the first embodiment of the present invention.

The outer edge of the top surface 1212A of the first microstructure unit 121 is a curve (as shown in FIG. 2A) or a straight line (as shown in FIG. 2B). Therefore, the two optical structure bodies with different structures can generate tile fight splitting effect and the light diffusion effect to the light beam emitted from the light-emitting portion 101. In FIG. 2A, the two optical structure bodies have the same maximum width P (both have the same pitch). The maximum width P is between 40 μm and 850 μm. The first lower point 131 and the second point 132 form a first width P, and the second low point 132 and another first low point 131 form a second width P (equal to the first pitch P1). The first width is equal to the second width (P=P1). In a preferred embodiment, the heights of the two optical structure bodies are equal, but can also be un-equal to each other. The difference of height is not over 50%. For example, when the height of the first microstructure unit 121 is 1, the height of the second microstructure unit 122 is between 0.5 and 1.5 to maintain the yield rate when the optical structure body is manufactured.

Reference is made to FIG. 2B. For light beam, the top surface 1212A has the light diffusion effect (the second optical path). The first side surface 1211A and the second side surface 1211B have the light splitting effect (the first optical path). The first microstructure unit 121 has two kinds of optical effects, not merely the light diffusion effect or the light splitting effect. For light strength, the light splitting strength of the first side surface 1211A and the second side surface 1211B is greater than the light diffusion strength of the top surface 1212A. For example, when the emitting light strength is 100, the light splitting strength is 51 and the light diffusion strength is 49, but those values are not limited to above. The second microstructure unit 122 generates the light diffusion effect (the third optical path).

Figure 2C:
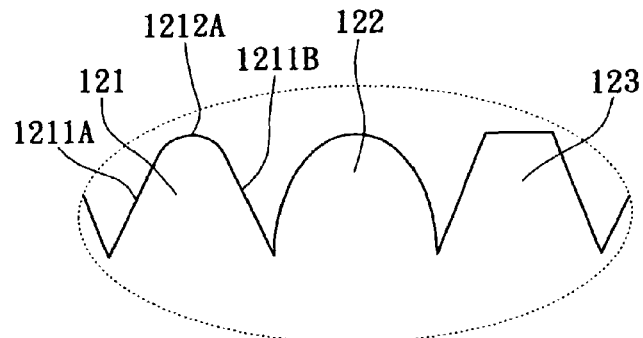
FIG. 2C is a further schematic diagram of the first embodiment of the present invention.

Reference is made to FIG. 2A. For light beam, the top surface 1212A that is curved has the light diffusion effect (the second optical path). The first side surface 1211A and the second side surface 1211B have the light splitting effect (the first optical path). For light strength, the light splitting strength of the first side surface 1211A and the second side surface 1211B is greater than the light diffusion strength of the top surface 1212A. In above two embodiments, the light-emitting portion 101 has two kinds of optical structure bodies. The substantially trapezoid shaped first microstructure unit 121 has both light splitting and light diffusion properties. Therein, by having the first microstructure unit 121 cooperating with the second microstructure unit 122 that has the light diffusion effect (the third optical path), the emitting light beam is uniformed for outputting a highly uniform light beam. Reference is made to FIG. 2C, which is the third embodiment of the present invention. This embodiment is changed from FIG. 2A. The light-emitting portion 101 further has a third microstructure unit 123 that is disposed repeatedly. The third microstructure unit 123 is the same as the first microstructure unit 121 in FIG. 2B. By utilizing the three kinds of optical structure bodies, the resulting light beam is highly uniformed.

Figure 3:
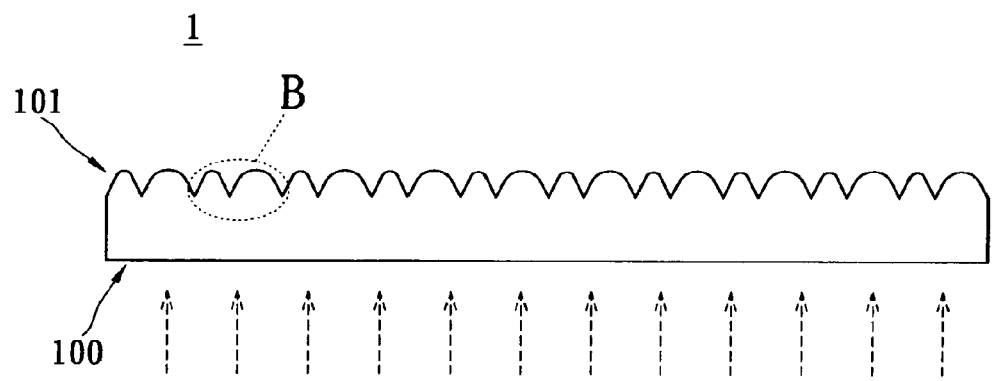
FIG. 3 is a schematic diagram of the microstructure diffuser of the second embodiment of the present invention.
Figures 3A, 3B:
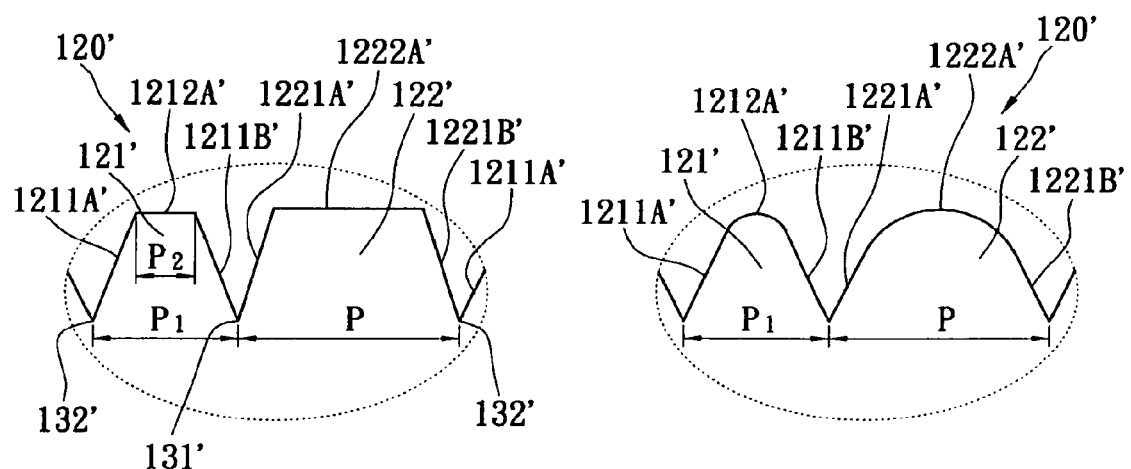
FIG. 3A is an enlarged diagram of part B in FIG. 2.
FIG. 3B is another schematic diagram of the second embodiment of the present invention.

Reference is made to FIGS. 3, 3A, and 3B, which show the second embodiment of the present invention. The difference between the second embodiment and the first embodiment is that this embodiment uses different pitches to define over two kinds of optical structure bodies on the light-emitting surface 101 of the microstructure diffuser 1. Reference is made to FIG. 3A, both the first microstructure unit 121' and the second microstructure unit 122' are ladder-shaped structures. The first microstructure unit 121' has a first side surface 1211A', a second side surface 1211B', and a top surface 1212A', and furthermore a first pitch P1, a second pitch P2 and a height H is defined. The first side surface 1211A' and the second side surface 1211B' respectively are located at two sides of the top surface 1212A', and have a first slope and a second slope. The second pitch P2 is the distance between the first side surface 1211A' and the second side surface 1211B'. The first pitch is another distance between the first side surface 1211A' and the second side surface 1211B'. In this embodiment, the first pitch P1 is the maximum width between the first side surface 1211A' and the second side surface 1211B', and the second pitch P2 is the minimum width between the first side surface 1211A' and the second side surface 1211B'. The height H is the distance between the top surface 1212A' and the light-entering surface 100. The first slope and the second slope meet the following equation: $½ \leq 2H(P1-P2)/2 \leq 9/5$, to achieve the best lighting status. Similarly, the second microstructure unit 122' has a third side surface 1221A', a fourth side surface 1221B', and a second top surface 1222A'. The third side surface 1221A' and the fourth side surface 1221B' respectively have a third slope and a fourth slope, are located at two sides of the second top surface 1222A'. The second microstructure unit 122' and the first microstructure unit 121' are adjacent to each other and are crossly and repeatedly disposed. The third side surface 1221A' of the second microstructure unit 122' and the second side surface 1211B' of the first microstructure unit 121' form a first low point 131'. The fourth side surface 1221B' of the second microstructure unit 122' and the first side surface 1211A' of another first microstructure unit 121' form a second low point 132'. The first low point 131' and the second low point 132' are located on the light-emitting surface 101. When the plurality of microstructure portions 120' receives the light beam of the light source 30, the first side surface 1211A' and the second side surface 1211B' of the first microstructure unit 121' form a first optical path. The third side surface 1221A' and the fourth side surface 1221B' of the second microstructure unit 122' receives the light beam of the light source 30 to form a second optical path. The top surface 1212A' of the first microstructure unit 121' receives the light beam of the light source 30 to form a third optical path. The second top surface 1222A' of the second microstructure unit 122' receives the light beam of the light source 30 to form a fourth optical path.

The difference between the first microstructure unit 121' and the second microstructure unit 122' is that both have different maximum widths. In this embodiment. The second microstructure unit 122' and the second side surface 1211B' of the first microstructure unit 121' from the first low point 131, and the first side surface 1211A' of another first microstructure unit 121' form a second low point 132'. The first low point 131' and the second low point 132' form a first width P. The second low point 132' and another first low point 131' form a second width P1. The first width P and the second width P1 are different. In other words, the first low point 131' and the second low point 132' form a first width P, the second low point 132' and another first low point 131' form a second width P1 (the first pitch P1), and the first width P is not equal to the second width P1 ($P \neq P1$). For example, P is 350 μm, and P1 is 300 μm. The range of the first width and the second width is the same as the first embodiment, and is between 40 μm and 850 μm. This embodiment utilizes the two ladder-shaped structures with different maximum widths to achieve the side surface light splitting effect and the top surface light diffusion effect and output the uniform light beam. Alternatively, the first microstructure unit can be a cone curve shape, and the cone coefficient of the cone curve is less than or equal to ($\leq$)−1.

Reference is made to FIG. 3B, which is the second type of the embodiment. The difference between FIG. 3B and FIG. 3A is that the top surface 1212A' of the first microstructure unit 121' is a curve, and the curved radius of the curve is less than or equal to ($\leq$) the first pitch P1 of the first microstructure unit 121'. The outer edge of the top surface 1222A' of the second microstructure unit 122' is also a curve, the curved radius of the curve is less than or equal to ($\leq$)−1. Similarly, by utilizing the side surface light splitting effect and the top surface light diffusion effect, the uniform light beam is outputted. In other words, the top surface 1222A' of the second microstructure unit 122' can be a curve or a straight line, and the top surface 1212A' of the first microstructure unit 121' also can be a curve or a straight line.

Furthermore, the light-emitting surface 101 further has a third optical structure body. For example, the third optical structure body has a third maximum width, or the top surface of the third optical structure body is a curve or a straight line, etc. By utilizing the optical structure body that can split light and diffuse light, the uniform light beam is outputted. The others are the same as the first embodiment, not repeated again.

Figure 4:
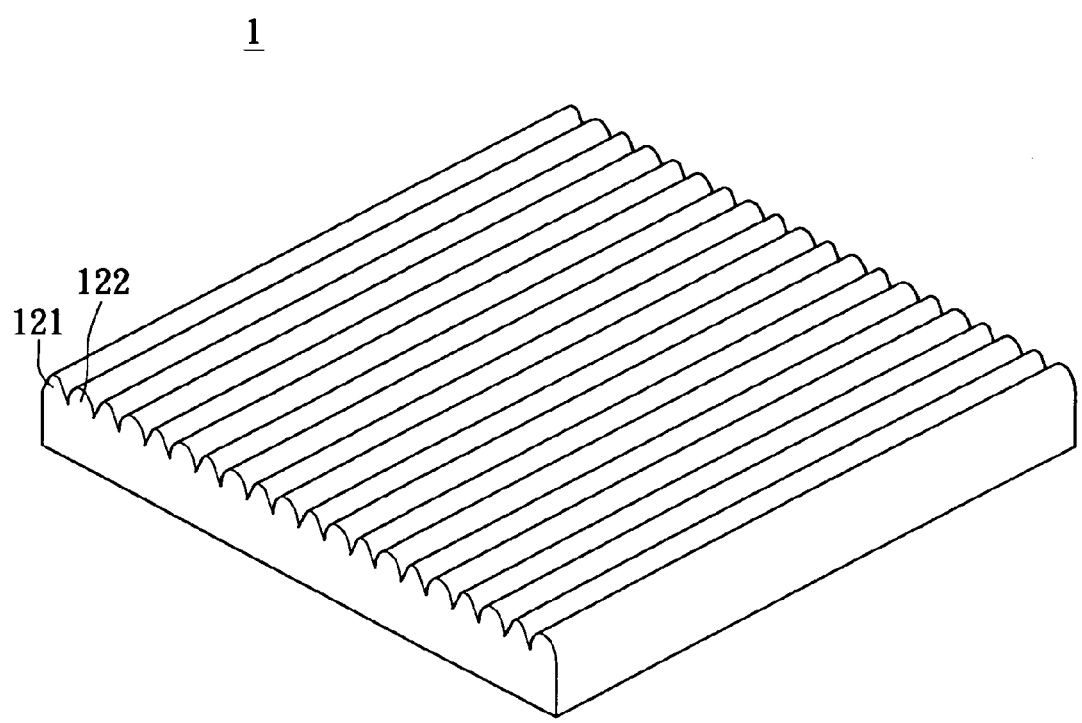
FIG. 4 is an one-dimensional schematic structure diagram of the first embodiment of the present invention.
Figure 5:
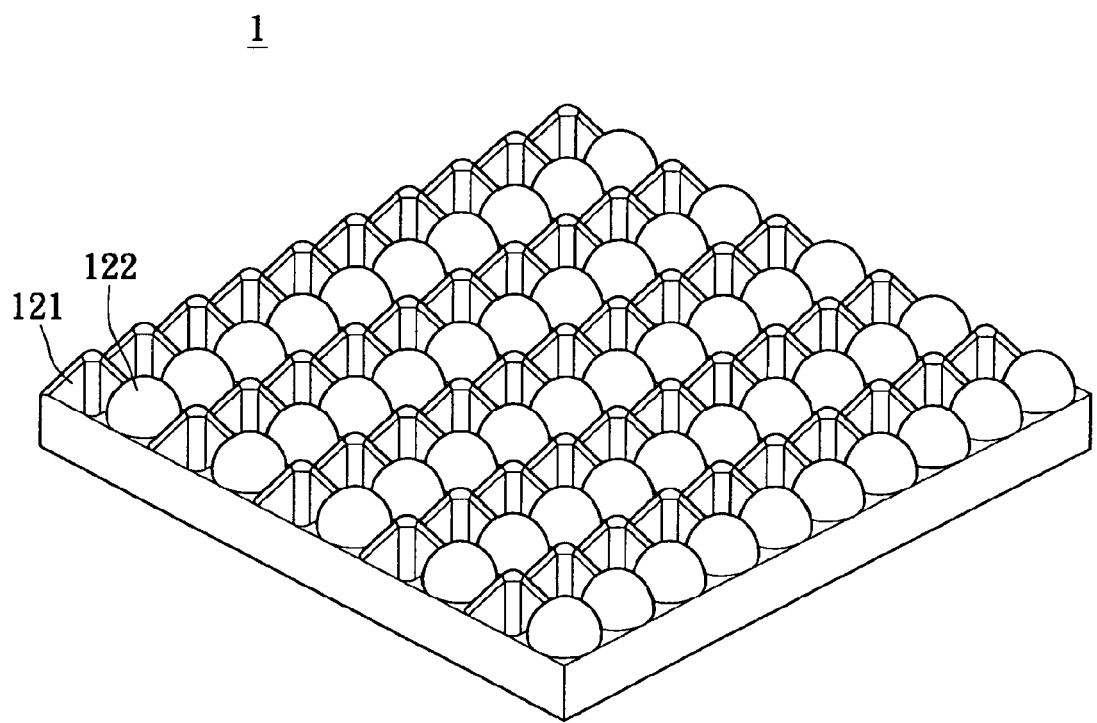
FIG. 5 is a two-dimensional schematic structure diagram of the first embodiment of the present invention.
Figure 5A:
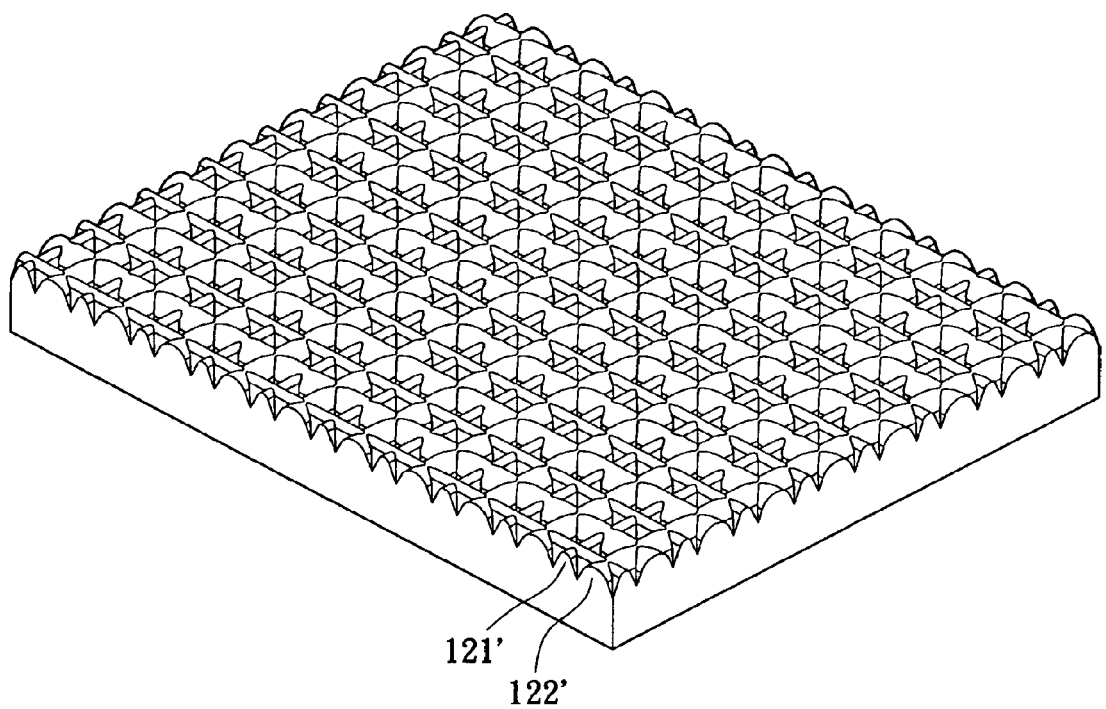
FIG. 5A is a two-dimensional schematic structure diagram of the second embodiment of the present invention.

The above structure can be changed according to the optical design. Reference is made to FIG. 4. When the microstructure diffuser 1 is applied to a lamp (such as a CCFL), the first microstructure unit 121, the second microstructure 122, or the third microstructure unit 123 is a one-dimensional structure on the light-emitting surface 101 (FIG. 4 merely shows the first microstructure unit 121 and the second microstructure unit 122). When the microstructure diffuser 1 is applied to a LED, the optical structure bodies are repeatedly and crossly disposed on the light-emitting surface 101 to form a two-dimensional structure. Under the two-dimensional structure, the optical structure bodies can be convex structures (FIG. 5 shows the two-dimensional structure of the convex structure of the optical structure body of the first embodiment), or a concave structures (FIG. 5A shows the two-dimensional structure of the concave structure of the optical structure body of the second embodiment). In other words, under different applications, the optical structure body can be changed to output uniform light beam. Similarly, the microstructure diffuser 1 in other embodiments also can be changed into a one-dimensional or two-dimensional structure to uniform the light beam.

Figure 6:
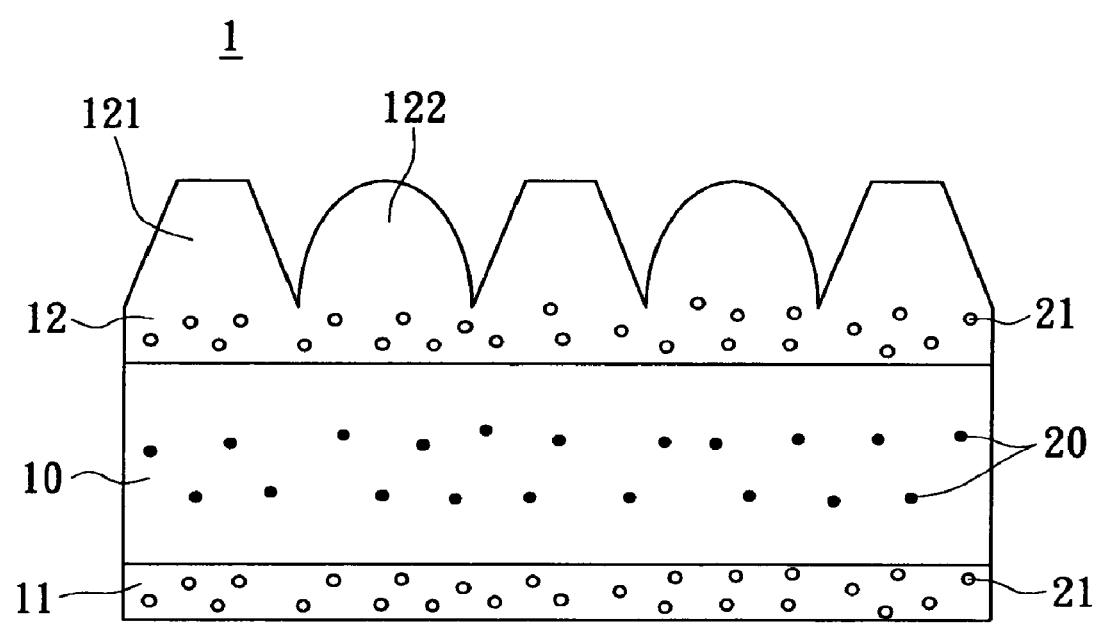
FIG. 6 is a schematic diagram of the structure of the microstructure diffuser of the present invention.

Reference is made to FIG. 6, which show the structure of the microstructure diffuser 1. The microstructure diffuser 1 includes a main layer, 10, a bottom layer 11 located below the main layer 10, and a microstructure layer 12 located above the main layer 10: The main layer is made of polystyrene (PS) or polycarbonate (PC), and includes diffuse particles 20 to uniform the light beam. The bottom layer 11 and the microstructure layer 12 are respectively located below and above the main layer 10, and are made of polystyrene (PS) or methylmethacrylate styrene (MS). The bottom layer 11 and the microstructure layer 12 further includes ultraviolet-absorbing particles 21 to absorb the ultraviolet of the light source or external light beam to prevent the microstructure diffuser 1 from being become yellow. The optical structure body is formed on the surface of the microstructure layer 12 (the light-emitting surface 101). The material and the number of the layers of the microstructure diffuser 1 are used for illustrating the present invention, and not used for limiting the scope of the present invention.

Figure 7:
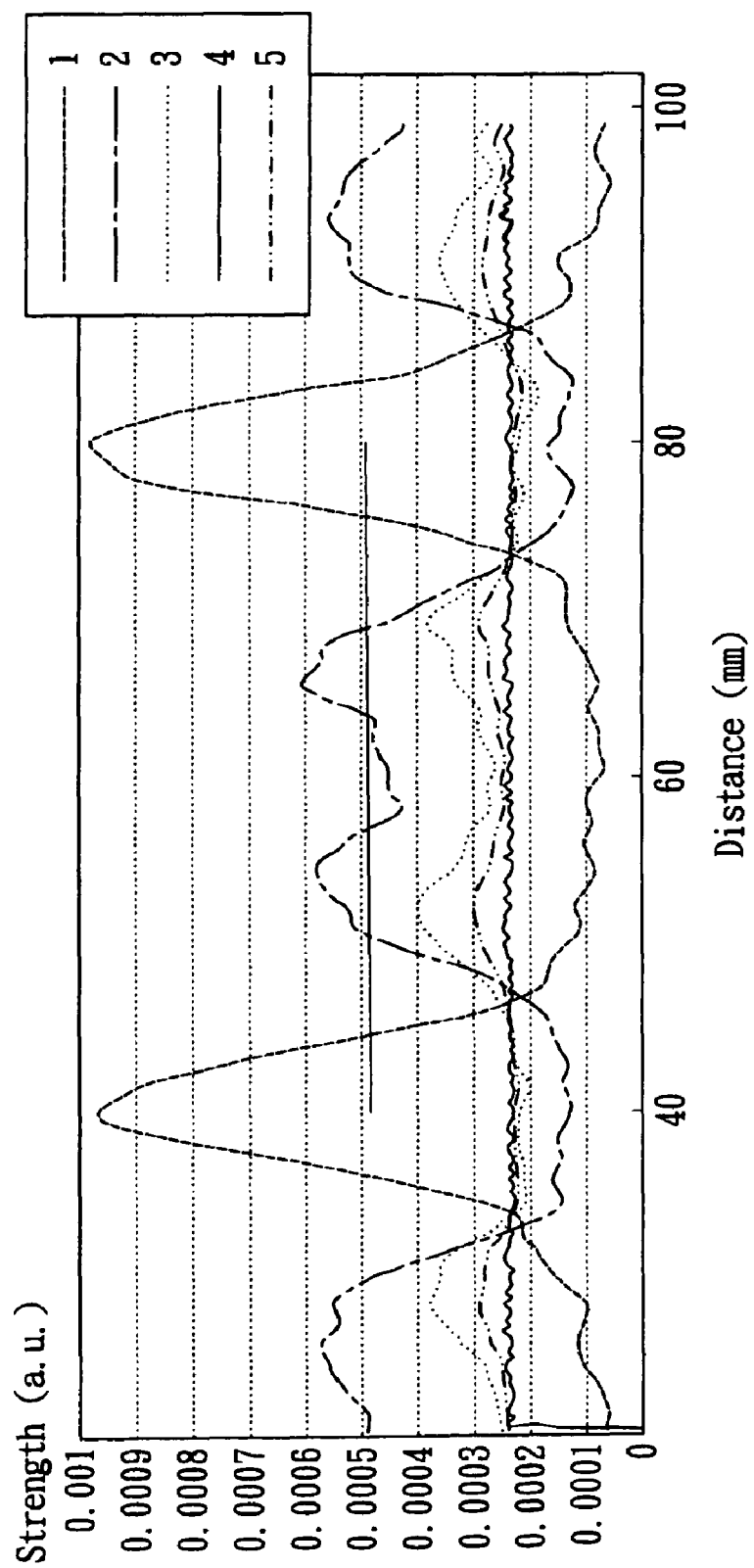
FIG. 7 is a spectrum diagram that shows the uniform light of the microstructure diffuser of the present invention and shows the non-uniform light of the diffuser of the prior art.

FIG. 7 is a schematic diagram of the light uniform of the microstructure diffuser 1 of the present invention and the diffuser of the prior art. Each curve represents the strength of the cross-section. Curve 1 is the strength of the light beam that has two CCFLs and does not have the diffuser. The two CCFLs are respectively located at 40 mm and 80 mm so that the light beam is focused onto the two locations. The strength of the light beam of the other area that is far away from the two locations is low. The light beam is not uniformed. Curve 2 represents that the two light sources has the diffuser with pointed prism. However, the curve 2 appears at the peak and the valley of the strength of the light beam. The uniformity of the light beam is not good. Curve 3 represents that the two light sources having a complex structure diffuser with a pointed prism and a lenticular (U.S. Pat. No. 7,255,456). The strength of the light beam is related to the distance of the CCFL. Curve 4 and curve 5 are respectively the strength of the light beam of the microstructure diffuser 1 of the first embodiment and the second embodiment of the present invention. From the curves 4 and 5, the microstructure diffuser 1 can improve the uniformity of the light beam. The strength of the light beam is not affected by the location of the CCFL. The microstructure diffuser 1 can output a highly uniform light beam.

According to the above strength of the light beam, the present invention can provide the highly uniform light beam. When the microstructure diffuser 1 is implemented to a product, the microstructure diffuser 1 merely needs two diffusing pieces. Comparing to the prior art that needs three diffusing pieces, the uniform effect and the production cost is better than the prior art.

Figure 8:
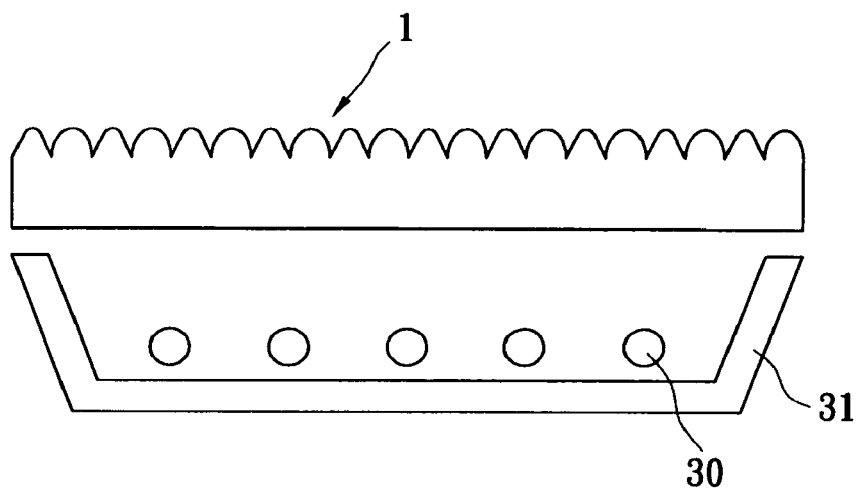
FIG. 8 is a schematic diagram of the backlight module with the microstructure diffuser of the first embodiment of the present invention.
Figure 8A:
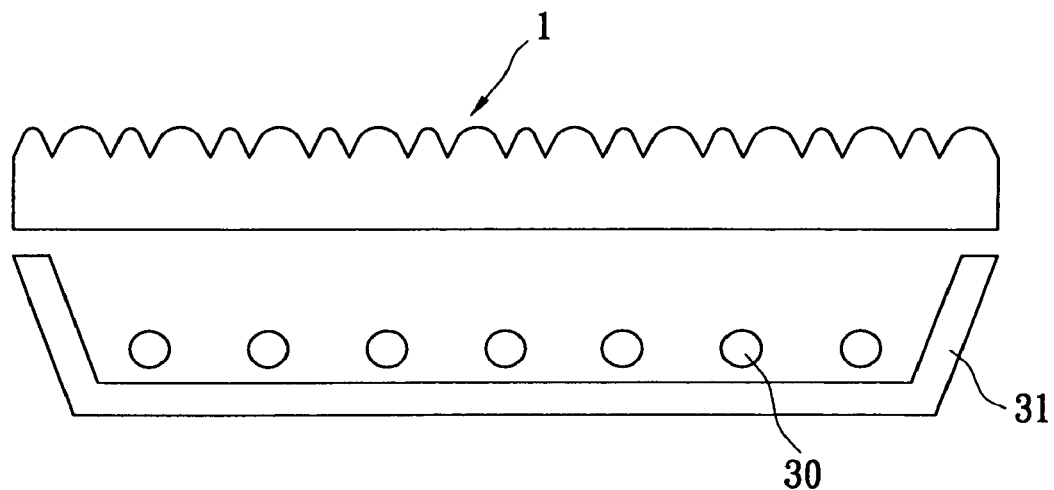
FIG. 8A is a schematic diagram of the backlight module with the microstructure diffuser of the second embodiment of the present invention.

Reference is made FIGS. 8 and 8A, which shows the backlight module 3 with the microstructure diffuser 1 of the present invention. FIG. 8 is the backlight module 3 with the microstructure diffuser 1 of the first embodiment of the present invention. FIG. 8A is the backlight module 3 with the microstructure diffuser 1 of the second embodiment of the present invention. The backlight module 3 includes at least one light source 30, and the microstructure diffuser 1. The microstructure diffuser 1 is located above the light source 30. The light source 30 is located in a space formed by a reflection structure 31 to generate a light beam with a high brightness. The light source 30 can be a CCFL, a LED, a FFL, an EEFL, a HCFL, or other lighting source. The characteristic of the microstructure diffuser 1 is the same as the previous embodiments, and so is not repeated again.

The present invention has the following characteristics. For example, the light is uniformed. Because the optical structure body has both the light diffusion effect and the light splitting effect and two kinds of the optical structure bodies can reduce the moiré interference problem, the microstructure diffuser can achieve the excellent light uniform effect. On the other side, because the microstructure diffuser can output the highly uniform light beam, the quantity of the films can be reduced when the microstructure diffuser is cooperated with other optical film. In other words, the microstructure diffuser can reduce the manufacturing cost of a final product (such as a display). Furthermore, the diffuser of the prior art has a prism. The prism has a pointed structure body. The optical film located above the diffuser will be scratched or damaged due to friction. However, because the top surface of the structure body of the present invention is flat or a curve, the above problem is solved.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A microstructure diffuser, having a light-entering portion and a light-emitting portion, wherein the light-entering portion receives a light beam of a light, comprising:
   a plurality of microstructure portions covered on the light-emitting portion, wherein the plurality of microstructure portions includes a first microstructure unit and a second microstructure unit, the first microstructure unit has a substantially trapezoid lateral cross section, the first microstructure unit has a first side surface, a second side surface, a top surface, a first pitch (P1), a second pitch (P2), and a height (H), the first side surface and the second side surface respectively have a first slope and a second slope, the first side surface and the second side surface are respectively located at two sides of the top surface and have a distance of the second pitch between the first side surface and the second side surface, the first side surface and the second side surface are respectively located at two sides of the light-emitting portion and have another distance of the first pitch between the first side surface and the second side surface, and the distance between the top surface and the light-emitting portion is the height;

wherein the first microstructure unit satisfies the following condition, $$½ \leq 2H/(P1-P2)/2 \leq 9/5;$$

wherein the second microstructure unit has a curve function shape and is located at the light-emitting portion, the second microstructure unit is adjacent to the first microstructure unit, the second side surface of the first microstructure unit and the second microstructure unit forms a first low point, the second microstructure unit and the first side surface of another first microstructure unit forms a second low point, and the first low point and the second low point are located at the light-emitting portion;

when the plurality of microstructure portions receive the light beam of the light source, the first side surface and the second side surface of the first microstructure unit receive the light beam of the light source to form a first optical path, the top surface of the first microstructure unit receives the light beam of the light source to form a second optical path, and the second microstructure unit receives the light beam of the light source to form a third optical path.

2. The microstructure diffuser as claimed in claim 1, wherein the second microstructure unit has a cone curve shape, and the cone coefficient of the cone curve is less than or equal to −1.

* * * * *